US006893066B1

(12) United States Patent
Lira-Núñez

(10) Patent No.: US 6,893,066 B1
(45) Date of Patent: May 17, 2005

(54) COMBINATION TOOL FOR TRANSFERRING LABELS AND APPLIQUES

(75) Inventor: Carmen Lira-Núñez, St. Cloud, MN (US)

(73) Assignee: The Antioch Company, St. Cloud, MN (US)

( * ) Notice: Subject to any disclaimer, the term of this patent is extended or adjusted under 35 U.S.C. 154(b) by 97 days.

(21) Appl. No.: 10/229,304

(22) Filed: Aug. 27, 2002

(51) Int. Cl.[7] .................................................. B25J 1/04
(52) U.S. Cl. ......................... 294/2; 294/24; 15/236.01; 7/170
(58) Field of Search ............................... 294/1.1, 2, 24; 30/149, DIG. 3; 15/236.01, 236.05; 433/141–143; 132/75.3, 75.4, 75.6; 7/100–102, 165, 166, 7/151, 152, 156, 170

(56) References Cited

U.S. PATENT DOCUMENTS 394,547 A * 12/1888 Thacker ......................... 7/166
1,206,585 A * 11/1916 Parrahm ...................... 12/103
1,461,686 A * 7/1923 Stone .................... 15/104.011
1,620,262 A * 3/1927 Klaboe ........................... 7/167
D116,216 S * 8/1939 Brekke ......................... D28/57
4,823,654 A * 4/1989 Moore .......................... 81/488
4,852,925 A * 8/1989 Lodin ............................ 294/2

* cited by examiner

*Primary Examiner*—Dean J. Kramer
(74) *Attorney, Agent, or Firm*—Gray, Plant, Mooty, Mooty & Bennett, P.A.; Peter Forrest

(57) ABSTRACT

A tool for use in transferring labels and appliques from one surface to another surface and for removing materials from a surface. The tool includes an elongated tool body having a taper portion, a grip portion and a blunt portion axially spaced along a longitudinal axis of the tool. The grip portion includes an enlarged area to be gripped by a user and is covered with a resilient cover material which is softer than the material of the tool body. The taper portion extends from a first longitudinal end of the tool body and includes sides tapering to a point which may be used for punching out small dye cuts, positioning stickers, or applying rub-on transfers. The blunt portion extends from a second longitudinal end of the tool body and is formed as an elongated, flexible portion of the tool which may be used to separate photographs attached to photo album pages.

24 Claims, 5 Drawing Sheets

COMBINATION TOOL FOR TRANSFERRING LABELS AND APPLIQUES

BACKGROUND OF THE INVENTION

1. Field of the Invention

The present invention relates generally to a tool for transferring materials to and from surfaces, and, more particularly, to a combination hand tool having an end for use in transferring materials to and from photo album pages and having another end for use in application of rub-on transfer materials and for use in punching out small dye cut items.

2. Description of Related Prior Art

In the process of preparing scrapbook pages, a variety of items may be placed on or removed from the scrapbook page, and such items typically include photographs and decorative stickers and labeling stickers, as well as other items for providing an attractive page layout. It is desirable to accurately place these items on a page, however, there is often difficulty in accurate placement of decorative items caused by the size of the items which are typically small and which commonly include an adhesive side for contacting the page.

In a further operation for creating a scrapbook, rub-on transfer sheets may be provided, such as for application to a photo album spine to provide an identifying label to the spine. Such rub-on labels require placement of a sheet over the surface to receive the label, or other transfer, and rubbing of the sheet over the area of the transfer in order to transfer the text or decorative material onto a receiving surface.

An additional activity associated with scrapbooking relates to transferring photographs from one album to another in order to ensure proper preservation of the photos. An example of such a desired transfer is the transfer of photographs from so-called magnetic albums, which have been found to cause chemical deterioration of photographs, to a photo safe album, having pages which are chemically neutral to the photographs. In such a transfer, there is a danger of tearing or otherwise damaging the photograph as it is being removed from the magnetic album page, such that careful manipulation of the photograph is required.

Accordingly, there are multiple tasks which may be performed in designing and assembling a photograph album. Such tasks would be facilitated by a tool capable of performing these and other tasks.

SUMMARY OF THE INVENTION

The present invention provides a tool for use in transferring labels and appliques from one surface to another surface and for removing materials from a surface. The tool includes an elongated tool body formed of a molded plastic material. The tool body defines a longitudinal axis and includes a taper portion, a grip portion and a blunt portion axially spaced along the longitudinal axis.

The grip portion includes an enlarged area forming a cylindrical surface extending about the longitudinal axis and defining first and second grip portion ends. A molded cover material is provided covering the grip portion. The cover material defines a softer material than the material forming the tool body.

The taper portion of the tool body extends from the first longitudinal end of the grip portion and includes top and bottom taper portion surfaces which angle toward each other in a direction away from the grip portion. The taper portion further includes opposing taper portion side edges which taper toward each other in a direction away from the grip portion and meet at a point.

The blunt portion extends from the second end of the grip portion and includes top and bottom blunt portion surfaces which angle toward each other in a direction away from the grip portion. The blunt portion further defines opposing side edges which terminate at a distal end defined by an edge extending transverse to the longitudinal axis. The bottom surface of the blunt portion at the distal end is substantially planar, and the top surface of the blunt portion at the distal end is upwardly convex. An indicia is provided on one of the top surfaces of the tool for reference in orienting the bottom surface of the blunt portion downwardly.

Other objects and advantages of the invention will be apparent from the following description, the accompanying drawings and the appended claims.

DETAILED DESCRIPTION OF THE PREFERRED EMBODIMENT

Figure 1:
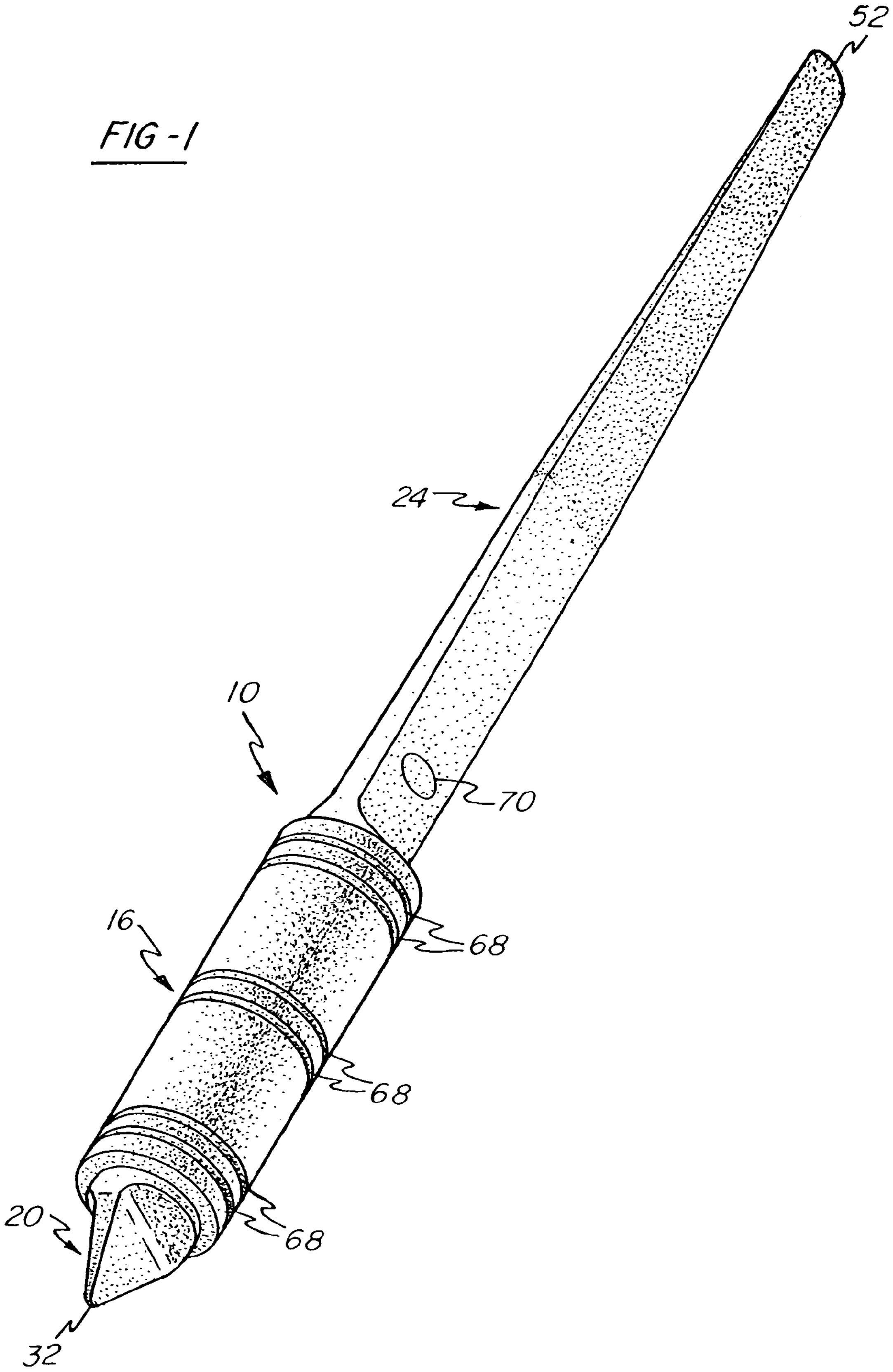
FIG. 1 is a perspective view of the tool of the present invention.

Referring to FIGS. 1–6, the tool 10 of the present invention comprises an elongated tool body 12 defining a longitudinal axis 14, and including a grip portion 16. The tool body 12 is preferably formed of a molded ABS plastic material, and the grip portion 16 is preferably provided with a cover portion 21 formed of a molded Santoprene material extending over a grip area 18 (see FIG. 9) of the tool body 12.

Figure 7:
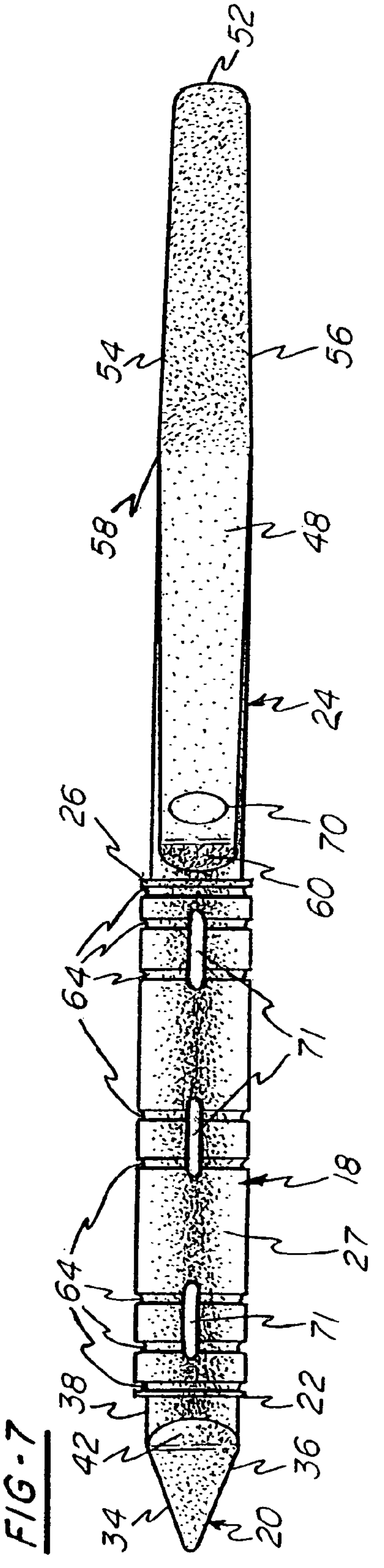
FIG. 7 is a top plan view of the tool body.
Figure 8:
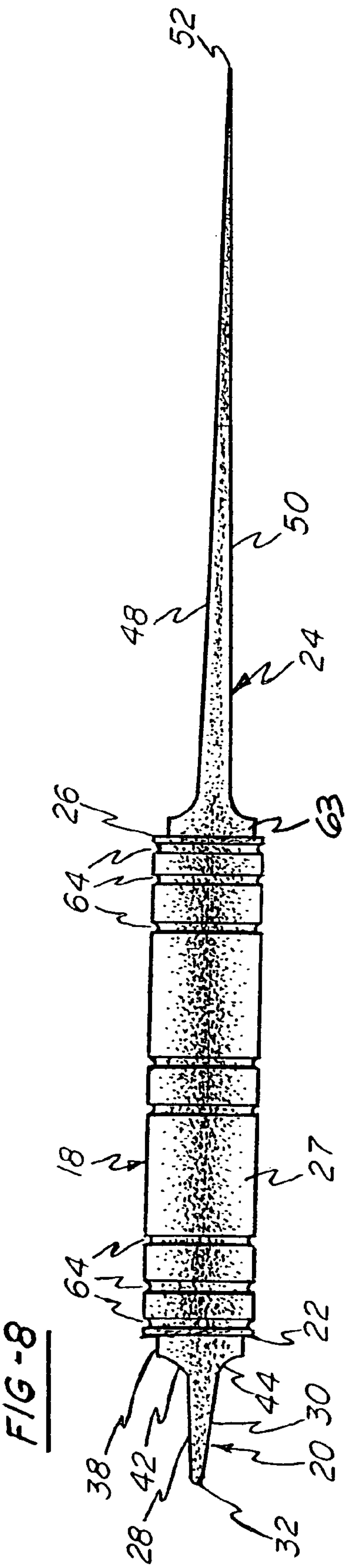
FIG. 8 is a side edge view of the tool body.

Referring additionally to FIGS. 7 and 8, the tool body 12 is further formed with a taper portion 20 extending axially from a first longitudinal end 22 of the grip area 18, and a blunt portion 24 extending axially from a second end 26 of the grip area 18. The grip area 18 is formed by a generally continuous circumferentially curved surface 27 extending about the longitudinal axis 14, and most preferably is formed as a cylindrical surface defining an enlarged area of the tool body 12.

Figure 4:
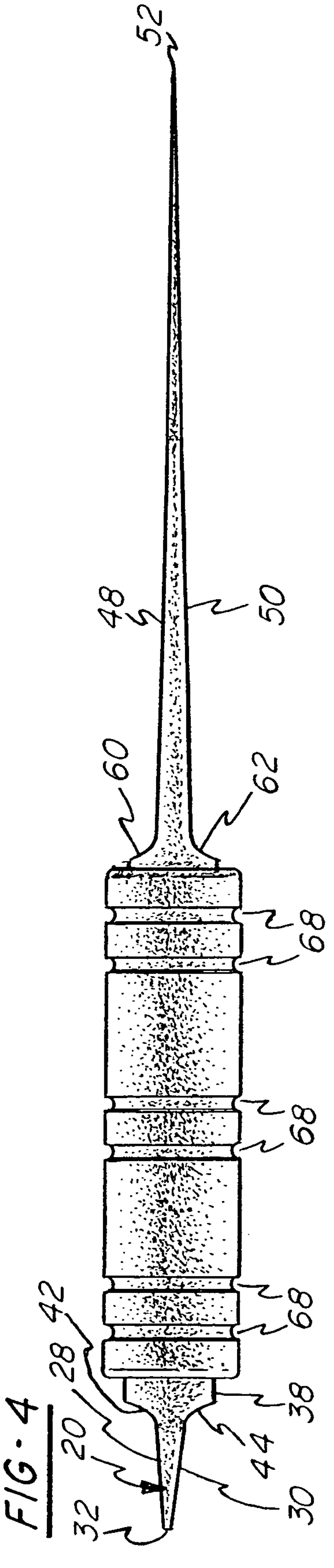
FIG. 4 is a side edge view of the tool, the opposing side edge view being a mirror image.

The taper portion 20 is defined by top and bottom substantially planar surfaces 28, 30 (FIGS. 4 and 8) which angle toward each other to a point 32 in a direction away from the grip area 18. The taper portion 20 further includes opposing side edges 34, 36 which taper toward each other in a direction from the grip area 18 to the point 32 (see FIGS. 2, 7 and 9). The taper portion side edges 34, 36 extend from a cylindrical connector section 38 which extends from the first longitudinal end 22 of the grip area 18. As seen in FIGS. 4 and 8, concavely radiused surfaces 42, 44 extend from the connector section 38 to the respective top and bottom surfaces 28, 30 of the taper portion 20.

Figure 2:
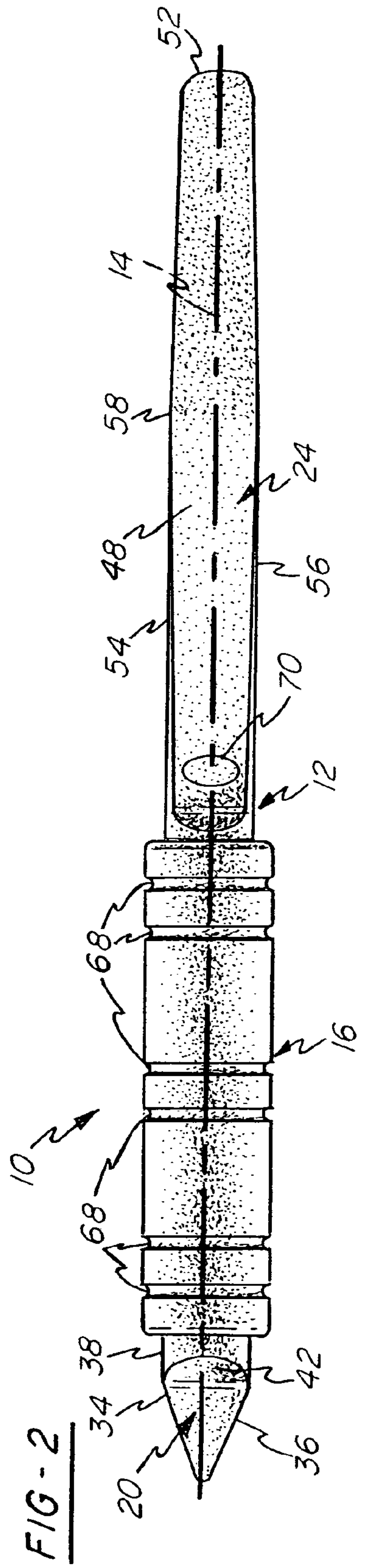
FIG. 2 is a top plan view of the tool.
Figure 3:
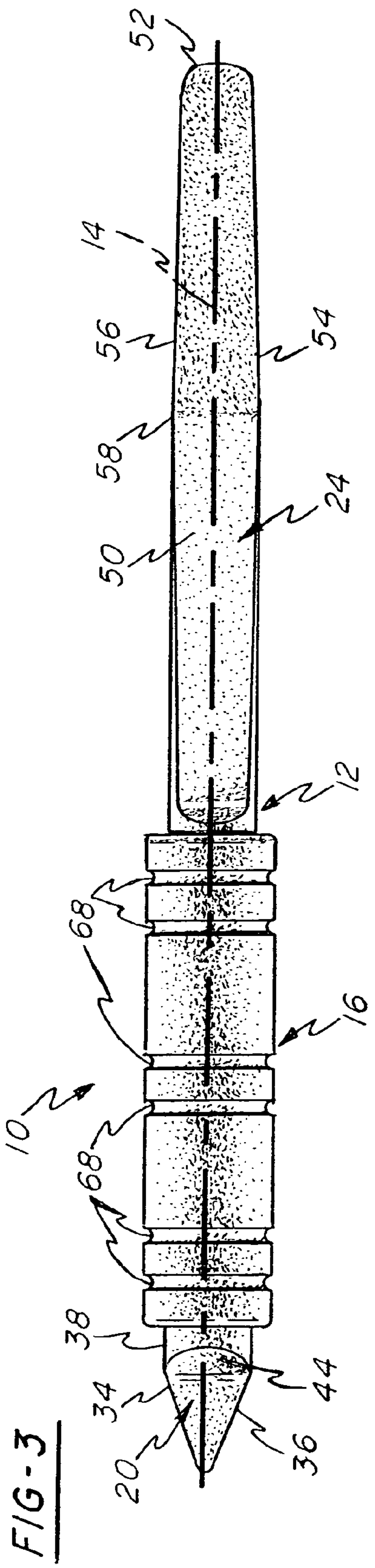
FIG. 3 is a bottom plan view of the tool.

Referring to FIGS. 4 and 8, the blunt portion 24 includes opposing top and bottom surfaces 48, 50 which angle toward each other in a direction away from the grip area 18 to a distal end 52 defined by a broad edge extending transversely to the longitudinal axis 14. The blunt portion 24 further includes opposing side edges 54, 56 extending from the second longitudinal end 26 of the grip area 18 to the distal edge 52, and the side edges 54, 56 taper toward each other slightly from a point 58 intermediate the second longitudinal end 26 and the distal end 52 (FIG. 2). In addition, concavely curved surfaces 60, 62 define transitions connecting a cylindrical section 63 at the second longitudinal end 26 to the top and bottom surfaces 48, 50 of the blunt portion 24.

Figure 6:
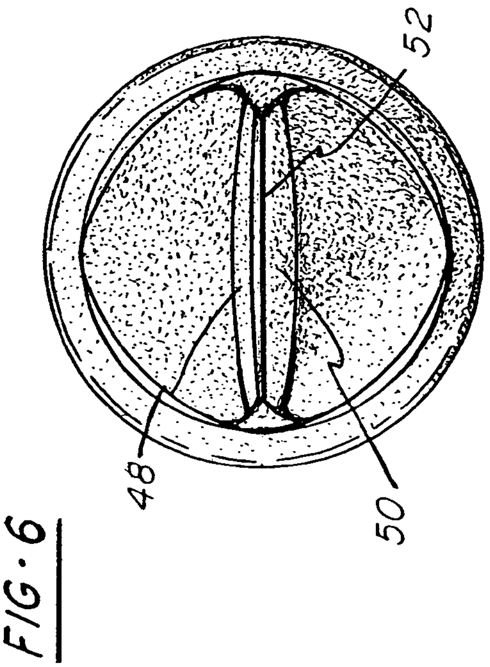
FIG. 6 is a rear end view of the tool.
Figure 5:
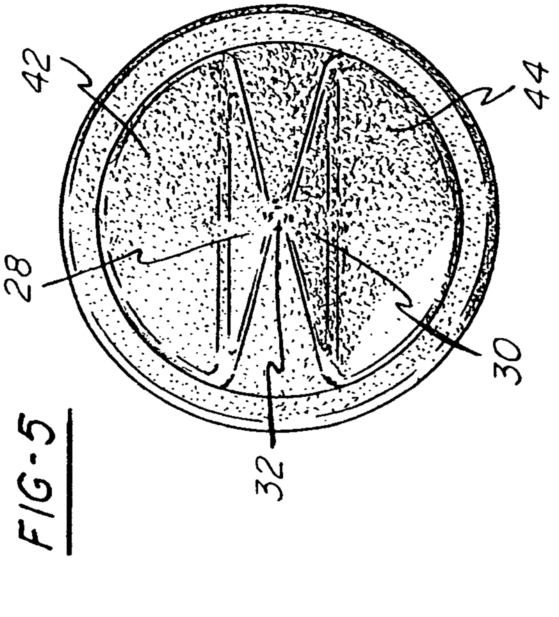
FIG. 5 is a front end view of the tool.

Referring to FIG. 6, it should be noted that the bottom surface 50 of the blunt portion 24 is substantially planar and the top surface 48 of the blunt portion 24 at the distal end 52 is upwardly convex.

Referring the FIGS. 7 and 8, it can be seen that the grip area 18 is formed with a plurality of radially extending contours 64. In the illustrated embodiment, the contours 64 comprise indentations or grooves extending radially into the cylindrical surface 27 of the grip area 18.

Figure 9:
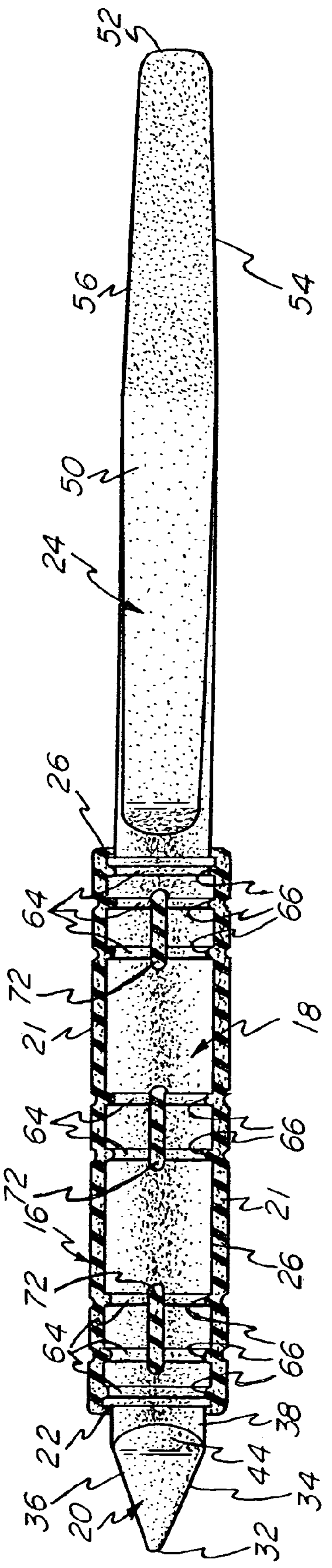
FIG. 9 is a bottom plan view of the tool in partial cross-section with a lower half of the cover portion cut away.
Figure 10:
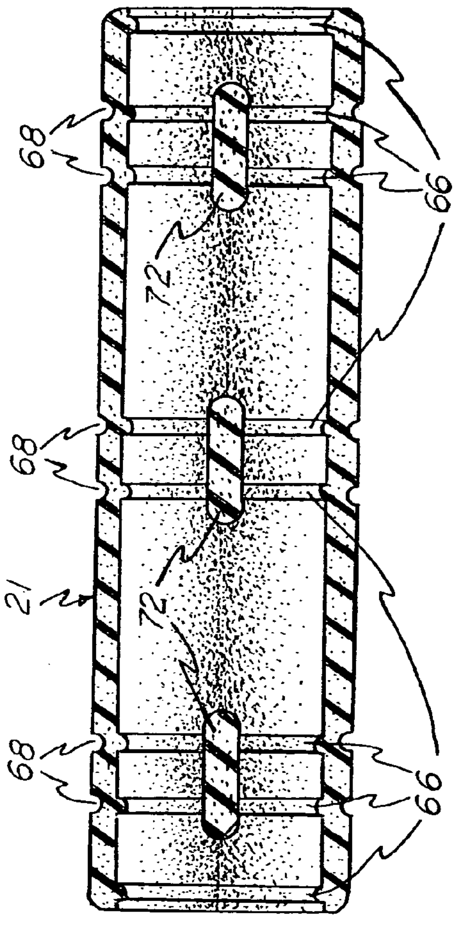
FIG. 10 is a cross-sectional view taken through the cover portion of the tool.

Referring further to FIGS. 9 and 10, it can be seen that the Santoprene cover portion 21 includes cooperating radially extending contours 66 engaging the contour 64 of the grip area 18 whereby the cover portion 21 is held in position on the grip area 18. In addition, the grip area 18 is formed with through holes 71, and the Santoprene material of the cover portion 21 includes transverse portions 72 extending through the holes 71 whereby the cover portion 21 is integrally attached to the grip area 18.

It should be understood that the Santoprene material of the cover portion 21 provides a resilient surface for the grip portion 16 of the tool 10 having an enlarged diameter which facilitates handling of the tool 10. Further, it should be noted that the exterior surface of the cover portion 21 is provided with circumferentially extending grooves 68 to facilitate positioning of the grip portion 16 in a user's hand.

The length of the grip portion 16 is dimensioned sufficiently long between the first and second longitudinal ends 22, 26 to comfortably fit in a user's hand, and is preferably approximately 57 mm long. The taper portion 20 is approximately 18.5 mm from the first longitudinal end 22 of the grip area 18 to the tip 32. The short dimension of the taper portion 20 facilitates delicate operations, such as punching small areas of dye cut shapes or stickers or handling stickers when placing them on an album page. In addition, the end 32 is adapted to be used for rubbing transfer sheets such as may be required for rub-on transfer of labels to surfaces.

The blunt end 24 is approximately 88.9 mm from the second longitudinal end 26 of the grip area 18 to the distal end 52, and the blunt portion 24 is substantially flexible from the point 58 to the distal end 52 such that the blunt portion 24 comprises a spatula-like tool. In particular, the blunt end 24 may be used to remove photos from magnetic albums, which are believed to be chemically detrimental to the preservation of photographs, by placing the bottom surface 50 against the album page and sliding the tool forward to engage the top surface 48 of the tool 10 with the bottom surface of the photograph. The convex shape of the surface 48 facilitates separation of the photograph from the page, such as through movement of a corner of the distal end 52 under the photograph to cause the photo to rise from the page as the convex surface 48 moves under the photograph. In order to facilitate proper orientation of the tool 10 with the bottom surface 50 facing downwardly, an indicia 70 is provided on the top surface 48, such that the indicia 70 will be visible when the tool 10 is properly oriented.

It should further be understood that the spatula-like blunt portion 24 may be used for other operations such as handling stickers when placing them on an album page, or removal and replacement of stickers on an album page in order to reposition the stickers. Further, the blunt portion 24 is particularly dimensioned and configured to be used with albums which include pages having stitches, such as metal stitches, positioned along the page edges for receiving album straps threaded therethrough. Such album pages are sold by Creative Memories of St. Cloud, Minn. The blunt portion 24 may be inserted through these stitches to align the stitches and facilitate passage of straps through these stitches when assembling the album. In accordance with this object, the width of the blunt portion 24 is approximately 10.5 mm at its widest point.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A tool for use in transferring labels and appliques from one surface to another surface and for removing materials from a surface, the tool comprising:

an elongated tool body defining a longitudinal axis and including a taper portion, a grip portion and a blunt portion lying axially along said longitudinal axis;

said grip portion comprising an enlarged area formed by a generally continuous circumferentially curved surface extending about said longitudinal axis, and said grip portion defining a first longitudinal end and a second longitudinal end;

said taper portion extending from said first longitudinal end and including top and bottom taper portion surfaces and opposing taper portion side edges, said opposing taper portion side edges tapering toward each other in a direction away from said grip portion and meeting at a point on the longitudinal axis;

said blunt portion extending from said second longitudinal end and including top and bottom blunt portion surfaces and opposing blunt portion side edges, said blunt portion side edges terminating at a distal end defined by a broad edge extending transverse to said longitudinal axis.

2. The tool of claim 1 wherein said tool body is formed of a plastic material and said grip portion is covered with a molded cover material which is softer and more resilient than said plastic material.

3. The tool of claim 2 wherein said grip portion is formed with radially extending contours defined on said circumferentially curved surface and said molded cover material is formed with complementary radially extending contours for engaging said contours on said grip portion.

4. The tool of claim 1 wherein said circumferentially curved surface comprises a cylindrical surface.

5. The tool of claim 4 including concavely radiused surfaces extending from said grip portion to said top and bottom surfaces of said taper portion and concavely radiused surfaces extending from said grip portion to said top and bottom surfaces of said blunt portion.

6. The tool of claim 5 wherein said top and bottom surfaces of said taper portion angle toward each other in a direction away from said radiused surfaces.

7. The tool of claim 5 wherein said top and bottom surfaces of said blunt portion angle toward each other in a direction away from said radiused surfaces.

8. The tool of claim 1 wherein said bottom surface of said blunt portion at said distal end is generally planar, and said top surface of said blunt portion at said distal edge is upwardly convex.

9. The tool of claim 8 including an indicia on at least one of said top surfaces for reference in orienting said bottom surface of said blunt portion.

10. A tool for use in transferring labels and appliques from one surface to another surface and for removing materials from a surface, the tool comprising:

an elongated tool body formed of a molded plastic material, said tool body defining a longitudinal axis and including a taper portion, a grip portion and a blunt portion axially spaced along said longitudinal axis;

said grip portion comprising an enlarged area formed by a cylindrical surface extending about said longitudinal axis, and said grip portion defining a first longitudinal end and a second longitudinal end;

a molded cover material covering said grip portion, said cover material defining a softer material than the material forming said tool body;

said taper portion extending from said first longitudinal end and including top and bottom taper portion surfaces and opposing taper portion side edges, said opposing taper portion side edges tapering toward each other in a direction away from said grip portion and meeting at a point;

said blunt portion extending from said second longitudinal end and including top and bottom blunt portion surfaces and opposing blunt portion side edges, said blunt portion side edges terminating at a distal end defined by a broad edge extending transverse to said longitudinal axis.

11. The tool of claim 10 wherein said grip portion is formed with radially extending contours defined on said circumferentially curved surface and said molded cover material is formed with complementary radially extending contours for engaging said contours on said edge grip portion.

12. The tool of claim 10 including concavely radiused surfaces extending from said grip portion to said top and bottom surfaces of said taper portion and concavely radiused surfaces extending from said grip portion to said top and bottom surfaces of said blunt portion.

13. The tool of claim 12 wherein said top and bottom surfaces of said taper portion angle toward each other in a direction away from said radiused surfaces.

14. The tool of claim 12 wherein said top and bottom surfaces of said blunt portion angle toward each other in a direction away from said radiused surfaces.

15. The tool of claim 10 wherein said bottom surface of said blunt portion at said distal end is generally planar, and said top surface of said blunt portion at said distal edge is upwardly convex.

16. The tool of claim 15 including an indicia on at least one of said top surfaces for reference in orienting said bottom surface of said blunt portion.

17. A tool for use in transferring labels and appliques from one surface to another surface and for removing materials from a surface, the tool comprising:

an elongated tool body formed of a molded plastic material, said tool body defining a longitudinal axis and including a taper portion, a grip portion and a blunt portion axially spaced along said longitudinal axis;

said grip portion comprising an enlarged area formed by a cylindrical surface extending about said longitudinal axis; and said grip portion defining a first longitudinal end and a second longitudinal end;

a molded cover material covering said grip portion, said cover material defining a softer material than the material forming said tool body, said grip portion is formed with radially extending contours defined on said circumferentially curved surface and said molded cover material is formed with complementary radially extending contours for engaging said contours on said grip portion;

said taper portion extending from said first longitudinal end and including top and bottom taper portion surfaces which angle toward each other in a direction away from said grip portion, said taper portion further including opposing taper portion side edges, said opposing taper portion side edges tapering toward each other in a direction away from said grip portion and meeting at a point;

said blunt portion extending from said second longitudinal end and including top and bottom blunt portion surfaces which angle toward each other in a direction away from said grip portion, said blunt portion further including opposing blunt portion side edges, said blunt portion side edges terminating at a distal end defined by a broad edge extending transversely to said longitudinal axis;

concavely radiused surfaces extending from said grip portion to said top and bottom surfaces of said taper portion and concavely radiused surfaces extending from said grip portion to said top and bottom surfaces of said blunt portion;

wherein said bottom surface of said blunt portion at said distal end is planar, and said top surface of said blunt portion at said distal end is upwardly convex; and including an indicia on at least one of said top surfaces for reference in orienting said bottom surface of said blunt portion downwardly.

18. A tool for use in transferring labels and appliques from one surface to another surface and for removing materials from a surface, the tool comprising:

an elongated tool body defining a longitudinal axis and including a taper portion, a grip portion and a blunt portion axially spaced along said longitudinal axis;

said grip portion comprising an enlarged area formed by a generally continuous circumferentially curved cylindrical surface extending about said longitudinal axis, and said grip portion defining a first longitudinal end and a second longitudinal end;

said taper portion extending from said first longitudinal end and including top and bottom taper portion surfaces and opposing taper portion side edges, said opposing taper portion side edges tapering toward each other in a direction away from said grip portion and meeting at a point;

said blunt portion extending from said second longitudinal end and including top and bottom blunt portion surfaces and opposing blunt portion side edges, said blunt portion side edges terminating at a distal end defined by a broad edge extending transverse to said longitudinal axis;

and further comprising concavely radiused surfaces extending from said grip portion to said top and bottom surfaces of said taper portion and concavely radiused surfaces extending from said grip portion to said top and bottom surfaces of said blunt portion.

19. The tool of claim 18 wherein said tool body is formed of a plastic material and said grip portion is covered with a molded cover material which is softer and more resilient than said plastic material.

20. The tool of claim 19 wherein said grip portion is formed with radially extending contours defined on said circumferentially curved surface and said molded cover material is formed with complementary radially extending contours for engaging said contours on said grip portion.

21. The tool of claim 18 wherein said top and bottom surfaces of said taper portion angle toward each other in a direction away from said radiused surfaces.

22. The tool of claim 18 wherein said top and bottom surfaces of said blunt portion angle toward each other in a direction away from said radiused surfaces.

23. The tool of claim 18 wherein said bottom surface of said blunt portion at said distal end is generally planar, and said top surface of said blunt portion at said distal edge is upwardly convex.

24. The tool of claim 23 including an indicia on at least one of said top surfaces for reference in orienting said bottom surface of said blunt portion.

* * * * *